Sept. 20, 1960   F. D. MARASSO   2,953,107
DOUGH MOLDING PROCESS
Original Filed Feb. 10, 1954   5 Sheets—Sheet 1
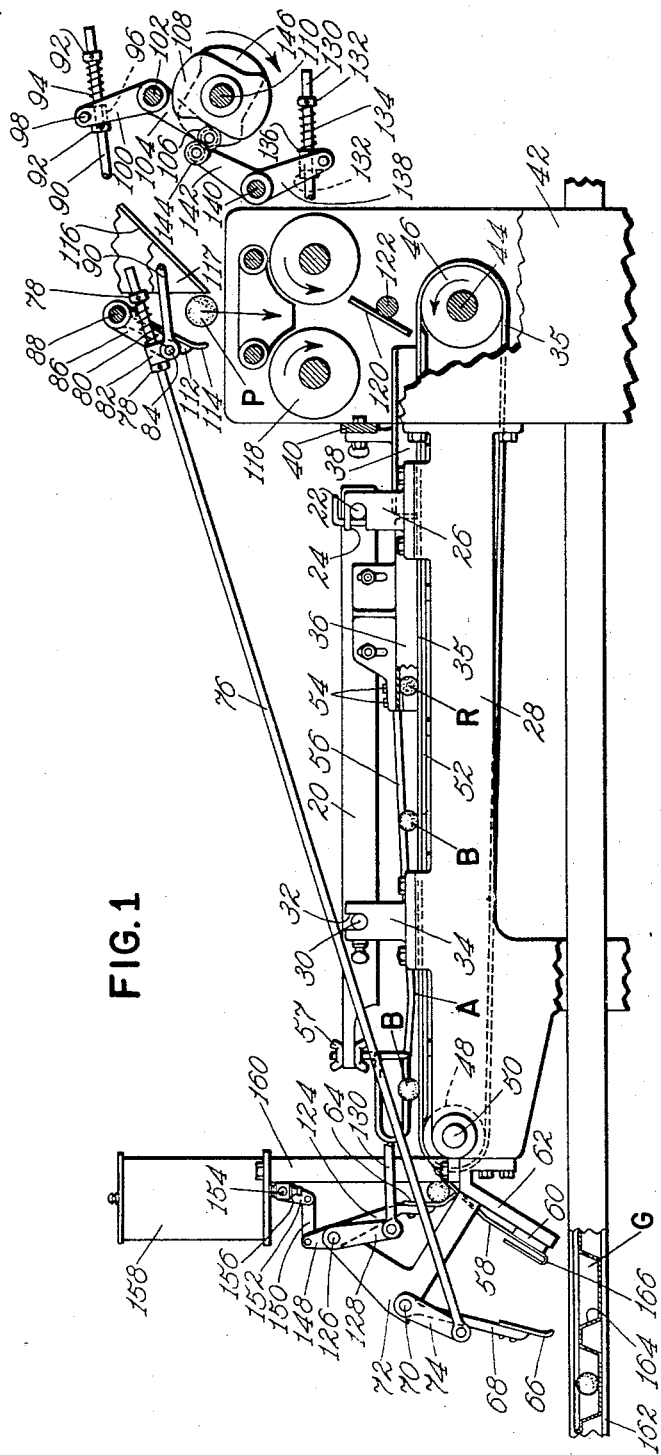
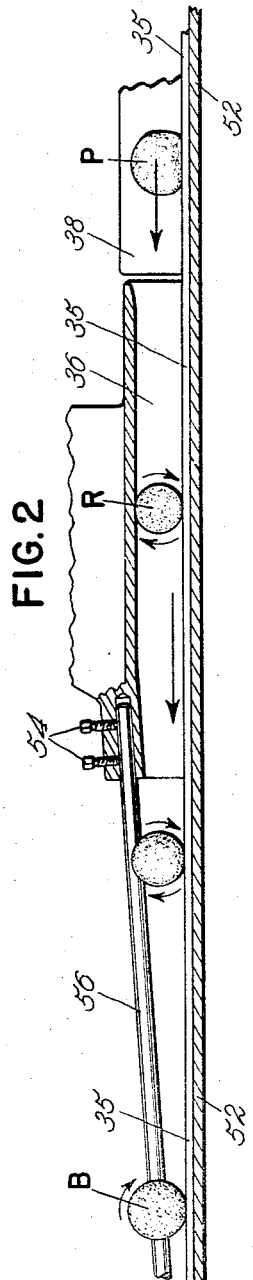
INVENTOR
FRED D. MARASSO
BY  Bradley Cohn
ATTORNEY

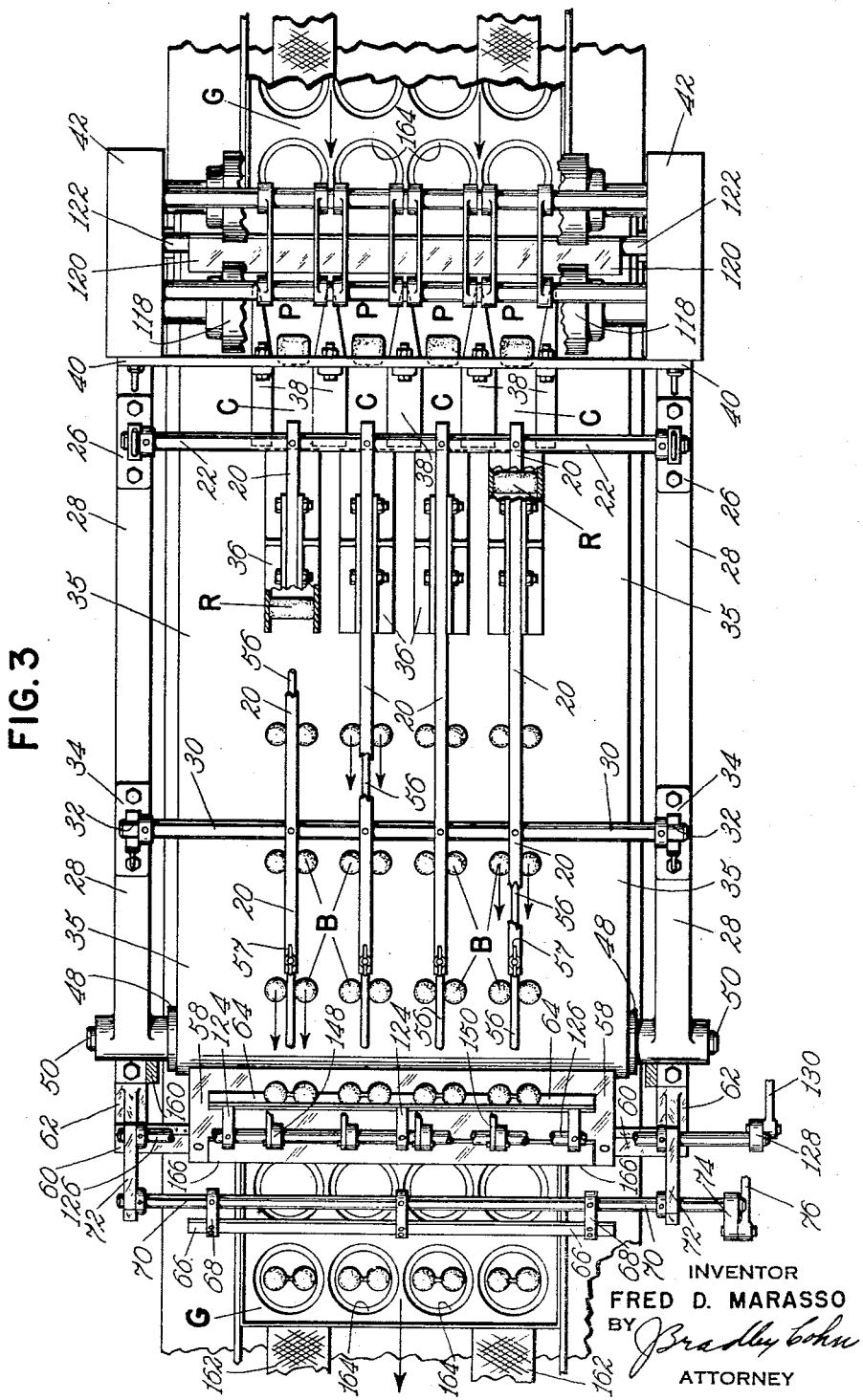

Sept. 20, 1960     F. D. MARASSO     2,953,107
DOUGH MOLDING PROCESS
Original Filed Feb. 10, 1954     5 Sheets-Sheet 3
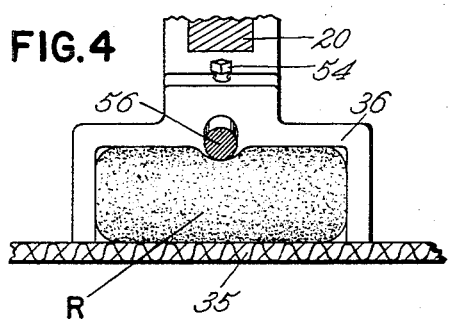
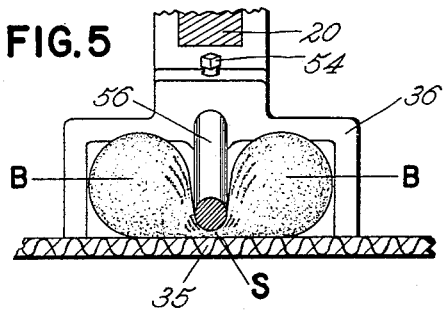
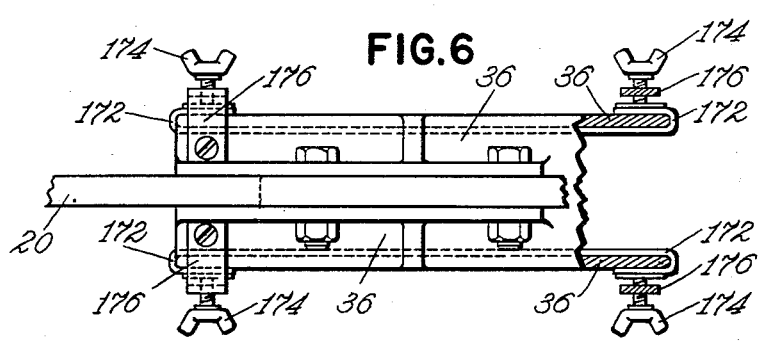
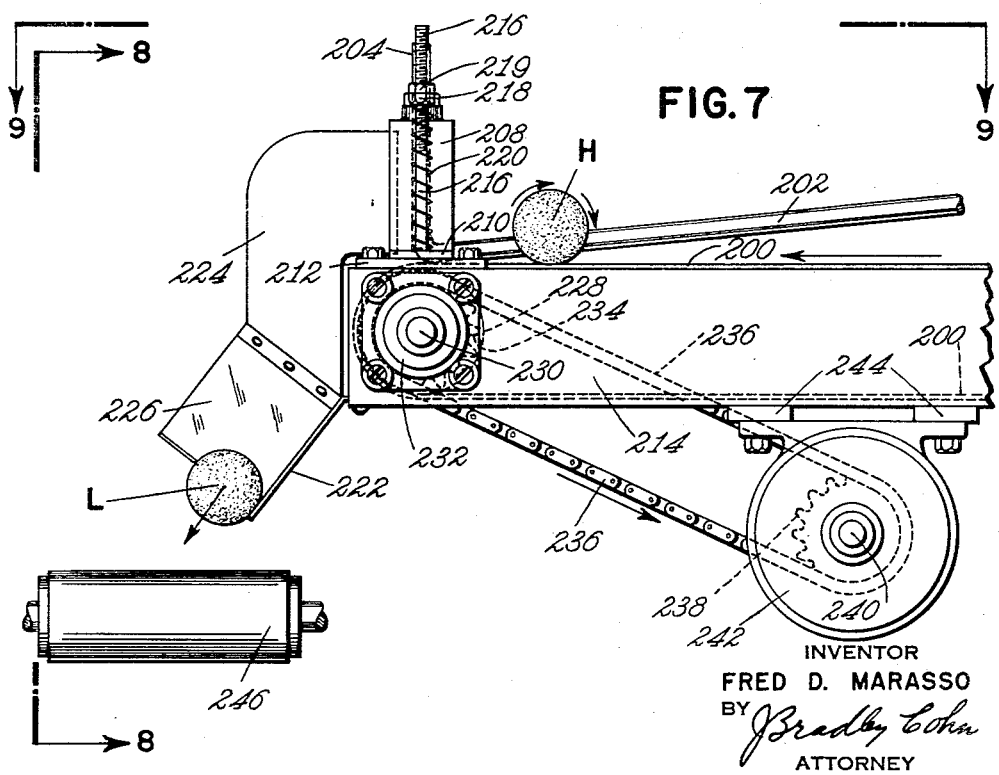
INVENTOR
FRED D. MARASSO
BY
ATTORNEY

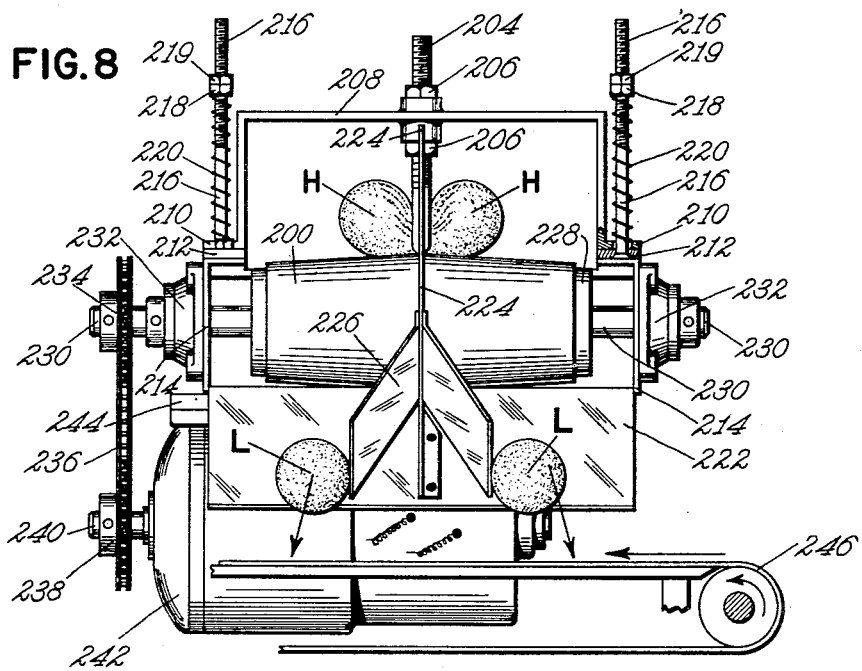
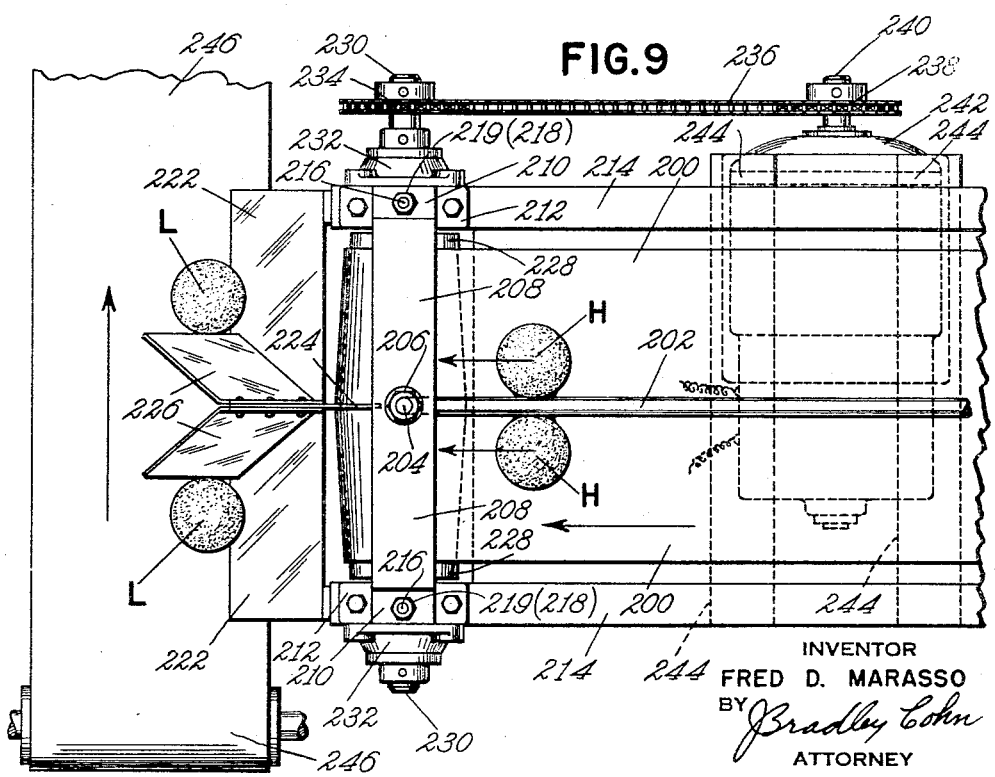

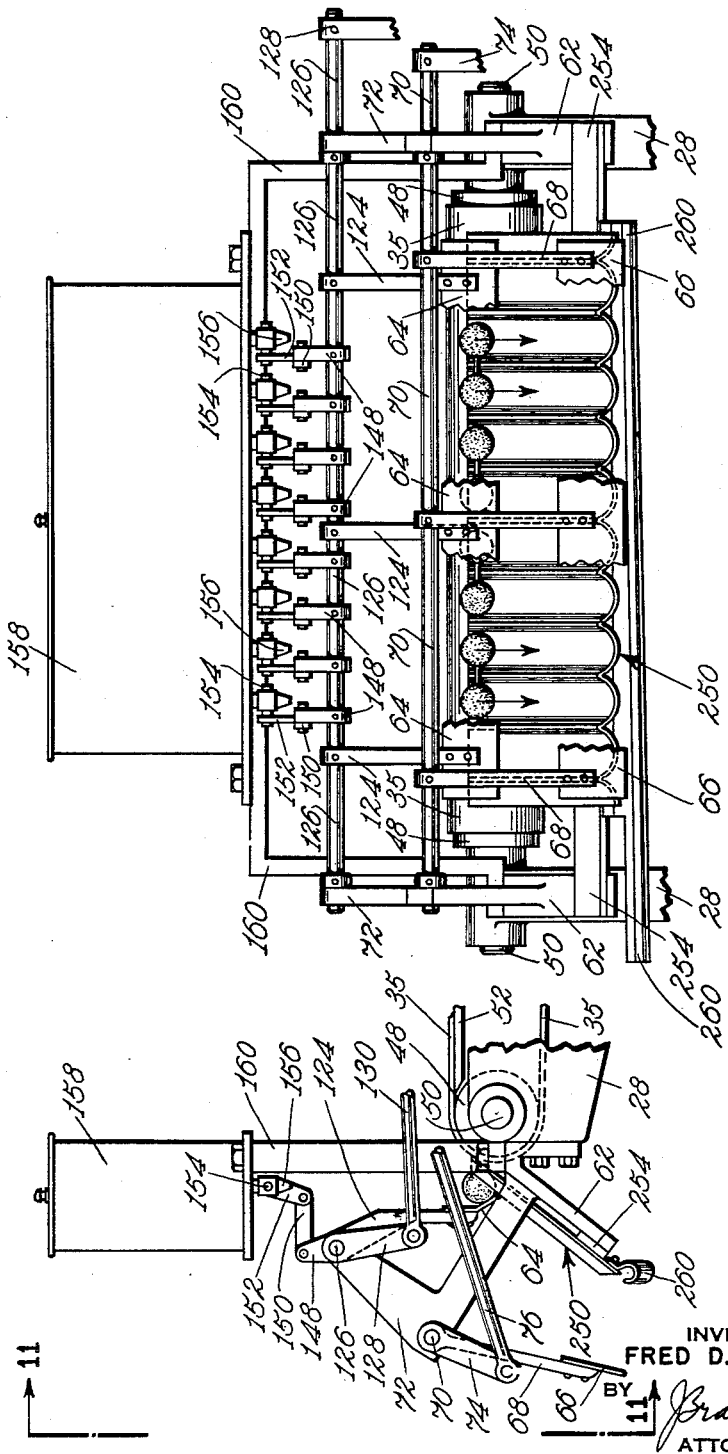

United States Patent Office 2,953,107
Patented Sept. 20, 1960

2,953,107

DOUGH MOLDING PROCESS

Fred D. Marasso, Richmond, Va., assignor, by mesne assignments, to American Machine & Foundry Company, New York, N.Y., a corporation of New Jersey Original application Feb. 10, 1954, Ser. No. 409,301, now Patent No. 2,919,664, dated Jan. 5, 1960. Divided and this application May 22, 1959, Ser. No. 815,206

5 Claims. (Cl. 107—54)

This invention is a division of my application Serial No. 409,301 filed February 10, 1954 and now Patent No. 2,919,664 dated January 5, 1960.

The invention relates to molding and panning dough lumps. More particularly, it relates to a molding process designed to mold twin dough lumps to produce twin or split rolls. With this type of roll it is desired to place two small rolls of dough in each pan cup or, in the case of flat pans, to place the rolls of dough in groups of two.

It is an object of the invention to obviate depositing two separately molded balls in a single cup of a tray. Accordingly, it is an object of the invention to mold a dough lump so that twin rolls of dough connected by a small "string" of dough is produced instead of a single round ball. This "twin" lump may then be handled as a single unit and deposited in a cup.

Therefore, it is an object of this invention to partially divide a lump of dough while molding it without fracturing the skin during the splitting or dividing.

A further object of this invention is to provide a process or method for molding and dividing a dough lump having a twin or dumb-bell configuration.

It is an advantage of this process that it may be applied to existing process equipment to produce split dough balls without reducing the capacity of the equipment.

The novel features which I believe to be characteristic of my invention are set forth with particularity in the appended claims. My process invention itself, however, may best be understood by reference to the following description taken in connection with the accompanying drawings of process equipment employing my novel method or process, in which:

Fig. 1 is a side elevation, partly in section, of the twin roll bar attachment shown in conjunction with an automatic molding and panning machine;

Fig. 2 is a partial sectional side elevation illustrating the molding channel and dividing rod of the twin roll attachment;

Fig. 3 is a plan view of the twin roll attachment in conjunction with the automatic molder and panner;

Figs. 4 and 5 are sectional end elevations illustrating the making of a twin roll from a single dough piece by means of the inclined dividing and molding rod;

Fig. 6 is a plan view, partly in section, of a modified molder channel with detachable liner to accommodate various sizes of dough pieces;

Fig. 7 is a side elevation of an embodiment of my invention for producing split loaves in bread manufacture;

Fig. 8 is an end elevation taken on line 8—8 of Fig. 7;

Fig. 9 is a plan view taken on line 9—9 of Fig. 7;

Fig. 10 is a side elevation of the delivery end of the twin roll attachment illustrating a modified delivery plate, and Fig. 11 is an end elevation taken on line 11—11 of Fig. 10.

With reference to the drawings, a plurality of evenly spaced parallel horizontal supporting members 20 are secured at one end to a horizontal shaft 22. Shaft 22 is detachably supported at each end in a horizontal slot 24 of a bracket 26 mounted on the main frame 28 of a machine of the type shown in my application Serial No. 262,744, now Patent No. 2,750,899. The invention, of course, could be applied to any molding or panning machine. The other ends of members 20 are secured to another horizontal rod 30 supported in vertical slots 32 of a pair of brackets 34 also mounted on the main frame 28 of the machine. A plurality of H-shaped molding channels 36 are adjustably suspended from each of the members 20 above an endless continuously moving conveyor belt 35. Each channel 36 butts its leading end against the end of a guide channel C formed by suitable rails or guide members 38 mounted on and suspended over the conveyor belt 35 from a horizontal supporting bar 40 secured to housings 42 of the frame structure of the machine.

Housings 42 enclose the driving means and form the bearings for a horizontal shaft 44 carrying a drive pulley 46 for conveyor belt 35. Belt 35 at the other end is led over an idler roller 48 mounted on a shaft 50 supported in suitable bearings in frame 28. The upper run of conveyor belt 35 is supported by a table plate 52 secured to the frame 28 of the machine.

The leading end of each divider rod 56 is secured to the trailing end of each molding channel 36 by means of set screws 54 (Fig. 2). Divider rods 56 slope downward towards conveyor belt 35 (Figs. 1, 2, 4 and 5) to a point A a short distance above said belt and then slope slightly upward, as illustrated in Fig. 1. Near its trailing end the divider rod 56 is adjustably secured to the trailing end of the horizontal supporting member 20. Adjustment of the height at point A may be made by wing nuts 57. Adjacent the delivery end of the conveyor belt 35 is mounted an inclined delivery plate 58 supported by a cross bar 60 secured to suitable brackets 62 mounted on the end of frame 28. In conjunction with the slanted delivery plate are arranged two alternately operating gates 64 and 66. Gate 66 is secured to a plurality of suitable arms 68 mounted on a horirzontal shaft 70 rotatably supported at its ends in suitable bearings of a pair of brackets 72 which may be attached to or integral with brackets 62 mentioned above. Gate 66 and arms 68 are activated through a lever 74 mounted on shaft 70 and operated by a connecting rod 76 (Fig. 1). The other end of rod 76, by means of a pair of collars 78 and a spring 80 is yieldingly connected to a lug 82 pivotally held by a stud 84 carried by an arm 86 mounted on a horizontal cross-shaft 88 suitably supported in bearings of a frame structure (not shown) of the machine.

To the stud 84 carried by arm 86 is also pivotally attached one end of a connecting rod 90 whose other end is yielding connected by means of a pair of collars 92 and a tension spring 94 to a lug 96 pivotally attached to a stud 98 on the free end of an arm 100 mounted on a shaft 102 also supported in bearings of a suitable frame structure (not shown) of the machine. The arm 100 is operated by an integral cam lever 104 engaging its roller 106 with a cam 108 on continuously rotating shaft 110 driven from the main drive (not shown) of the machine.

Shaft 88 is thus oscillated by cam 108 through cam lever 104, arms 100, rod 90 and arm 86. A plurality of arms 112 which carry a gate 114 are mounted on shaft 88. Gates 114 control the timing of the delivery of dough pieces P from a chute 116 through a pair of rotating rollers 118 onto deflector plate 120 and conveyor belt 35. Plate 120 is secured to a stationary cross shaft 122 held at each end by the two housings 42.

The gate 64 is mounted on a plurality of arms 124 secured to a cross shaft 126 supported at each end in suitable bearings of bracket 72. A lever 128 is secured to shaft 126 and articulated with a rod 130 yieldingly connected by means of two collars 132 and a spring 134 to a lug 136 pivotally attached to an arm 138 mounted on a shaft 140. On shaft 140 there is also a cam lever 142 carrying on its free end a cam roller 144 which engages a cam 146 on cam shaft 110.

Shaft 126 also carries a plurality of levers 148 (Figs. 1 and 11) each of which by means of a link 150 is connected to a valve control arm 152 mounted on a valve stem 154 of a valve faucet 156. Their operation is timed with the gate 64 so that oil may be dropped into the crevices of the split dough pieces as they are momentarily held by gate 64. The tank is supported by and mounted on a U-shaped bracket 160 secured to the brackets 62 (Figs. 1 and 11).

In operation, the twin roll bar attachment described above and shown in Figs. 1 through 5 of the drawings may be used in conjunction with a combined divider, proofer, molder and panner such as is illustrated and described in my aforementioned Patent No. 2,750,899 in which spaced rows of dough pieces are delivered to the inclined chute or aligning channel 116 which extends over the entire width of the machine. I have illustrated so much of that machine as is necessary for an understanding of the invention.

The inclined chute 116 is provided with a plurality of spaced vertical guide members or ribs 117 which are employed for controlling the lateral spacing of the dough pieces in each row. The gate 114 aligns each row of dough pieces and by proper timing spaces and locates each row on conveyer belt 35 below. Each dough piece P after dropping from guide chute 116 will fall into its own guide channel C (Fig. 3).

Continuously moving conveyer belt 35 carries the dough pieces P through their own guide channels C into the individual U-shaped molding channels 36 where they are rolled into a cylindrical dough piece R (Figs. 2 and 4). The rods 56 engage the center portion of dough pieces R (Fig. 4). As the roll R advances with belt 35, the rod (Fig. 2) depresses the center portion and at the same time causes the dough pieces to roll as illustrated by the arrows in Fig. 2. The roll R is thus gradually divided into the split dumb-bell shaped dough pieces B (Figs. 3 and 5). The skin of the dough piece B is continuous and unbroken. The short stalk S connects the two halves, facilitating the panning of the twin roll.

I have found that it is preferable that the lowest point A of rod 56 be positioned in advance of the end of the conveyor 35. By permitting the stalk S to rise, the dumb-bell dough pieces B roll more evenly and disengage immediately from rod 56. Where the lowest point A is the end of rod 56, an undesirable hesitation on the part of the dough pieces B was noted. The gate 64 momentarily halts the dough pieces B on the delivery plate 58. This aligns the row and permits a few drops of oil to be applied from the valve faucets 156. Gate 64 and faucets 156 are both operated through rod 130, the faucets opening as the gate closes.

The dough pieces are next arrested by gate 66 which closes as gate 64 opens. This breaks the momentum of the dough pieces and times its delivery into cup 164 of pan G. This synchronization is more fully described in my Patent No. 2,750,899. The inclined delivery plate 58 has a gutter 166 to catch excess oil so it does not fall on pans G or the pan conveyor 162.

The modified molding channel 170 illustrated in Fig. 6 differs from molding channels 36 shown in Figs. 1, 2, 3, 4 and 5 by providing channel 170 with a detachable canvas (or equivalent) liner 172. Selection of canvas strips 172 of various thickness permits variation of the width of the channel without effecting the centerline. Such a change may be done without tools or measuring instruments. Each thumb screw 174 engages a threaded hole in a bracket 176 secured to the U-shaped molding channel 170.

My invention may also be used to make split loaves. Such an embodiment of my invention is shown in Figs. 7, 8 and 9. A continuously running conveyor 200 moves beneath a suitable molding channel (not shown) of similar structure and design to a channel 36 or 170 in Figs. 1 to 6. A divider rod 202 slopes from the trailing end of the channel toward conveyor belt 200 to a point of substantially zero clearance. This last end of rod 202 is adjustably and yieldably supported as follows: the flange 210 of a bracket 208 is yieldably held against a plate 212 of machine frame member 214 by a spring 220 seated against jam nuts 218, 219 on bolt 216 of plate 212. The rod 202 is adjustably supported in the bracket by means of a pair of nuts 206 which receive a threaded vertical end 204 of rod 202.

A delivery slide plate 222 is secured to frame member 214 adjacent the end of belt 200. A divider plate 224 extends from the vertical end 204 of rod 202 around the end of conveyor belt 200 to and along plate 224 to which it is fastened. Delivery slide plate 222 also supports a pair of deflector plates 226 which are secured plow fashion to upright divider plate 224.

Conveyor belt 200 is driven by a crown pulley 228 and led over an idler crown pulley (not shown). The shaft 230 of drive pulley 228 is supported at each end by bearing brackets 232 secured to frame member 214. Shaft 230 carries a sprocket 234 driven by chain 236 from gear reduction motor 242 by sprocket 238 on motor shaft 240. Motor 242 is secured to bars 244 mounted on the frame members 214.

In operation, single large dough pieces are deposited at spaced intervals on conveyor belt 200 which carries them through the molding channel and beneath the sloping divider rod 202. The forward motion of the belt, of course, produces a rolling motion when the dough piece contacts the inner top of the stationary molding channel. This rolling motion (as indicated by the arrow in Fig. 7) continues as the dough piece passes beneath the divider rod 202. This rolling motion forms the two spherical dough pieces H without wounding the skin. Finally, the crown shape of the belt (Fig. 8) causes the halves H to separate completely as the rod 202 approaches zero clearance with belt 200. Deflector plates 226 are designed to properly space the split loaves L on the cross conveyor belt 246. Twin loaves connected by a stalk as in the case of the twin rolls may be produced by removing divider and deflector plates 224 and 226 and adjusting end 204 of rod 202 upwardly.

Where in the making of twin rolls it is desired to cover the entire surface of the skin of the twin rolls with oil instead of just the dividing portion, the machine may be provided with a modified delivery plate 250 illustrated in Figs. 10 and 11. Plate 250 is corrugated to form a plurality of parallel troughs 252. Plate 250 is mounted on a cross bar 254 secured on its two ends to brackets 62 of the machine. Valve faucets 156 are spaced to drop oil on each half B rather than into the dividing crevice between the two halves of the dough pieces. The spherical halves then rolling down each in its individual trough will distribute the oil over the entire surface of their skin and the cord or stalk between each two halves will ride over the elevated edge of two adjacent troughs 252, as illustrated in Fig. 11. No change is required in co-acting gates 64 and 66 nor in faucet 156 and their operating mechanism. A horizontal leader 260 is mounted at the bottom of trough 250 to collect the excess oil.

From the foregoing, it will be understood that my invention relates to a method and mechanism for dividing a dough lump and molding each half into a sphere by rolling the dough lump on a surface by means of a blunt member which advances progressively into the dough lump, dividing it in half. The relative motion between the blunt member and the surface draws the skin of the dough lump downward and around each of the halves while at the same time rolling the dividing dough lump to round each of the two segments.

I claim:

1. The method of forming twin or split dough lumps comprising, forming a single dough lump, rolling said dough lump while constantly applying pressure to an intermediate portion thereof and continuing the said application of pressure to said intermediate portion to divide said dough lump into two substantially round balls connected by a stalk, gradually releasing the pressure during rolling to cause said stalk to rise to form a dumb-bell shaped dough lump.

2. The method of forming twin or split dough lumps comprising, forming a single dough lump, confining said dough laterally, rolling said dough lump while laterally confined into a cylindrical form, rolling said cylindrically formed dough lump and during continued rolling of said dough lump constantly applying pressure to an intermediate portion thereof, releasing said dough lump from lateral confinement and continuing the application of said pressure to said intermediate portion to divide said dough lump into two substantially round balls connected by a stalk, and gradually releasing the pressure during rolling to cause said stalk to rise to form a dumb-bell like shaped dough lump.

3. The method defined in claim 1, further characterized by the additional step of applying oil to said formed stalk.

4. The method defined in claim 2, further characterized by the additional step of applying oil to said formed stalk.

5. The method of molding dough comprising, forming a single dough piece, rolling said dough piece along a defined pathway to form a cylindrically shaped dough piece, progressively and during continued rolling applying pressure to an intermediate portion thereof to mold said dough piece into two terminal spheres connected by a thin stalk having a single continuous skin, and maintaining said intermediately applied pressure on said stalk and shifting said spheres apart to draw said stalk out beyond its elastic limit to form two separate dough balls.

References Cited in the file of this patent

UNITED STATES PATENTS

| | | |
|---|---|---|
| 1,810,139 | Kirchhoff | June 16, 1931 |
| 2,162,079 | Grabowski et al. | June 13, 1939 |
| 2,243,338 | Harber | May 27, 1941 |